(12) United States Patent
Ragan et al.

(10) Patent No.: US 10,654,660 B2
(45) Date of Patent: May 19, 2020

(54) HYGIENIC MAGNETIC TRAY AND CONVEYOR

(71) Applicant: Laitram, L.L.C., Harahan, LA (US)

(72) Inventors: Bryant G. Ragan, Metairie, LA (US);
Shuchi P. Khurana, Metairie, LA (US);
John F. Landrum, New Orleans, LA (US);
Aditya Mehendale, Geldrop (NL);
Gerard Johannes Pieter Nijsse, Bodegraven (NL);
Funda Sahin-Nomaler, Eindhoven (NL);
Silvester Matheus Reijnders, Asten (NL);
Ewout Peter van der Laan, Eindhoven (NL)

(73) Assignee: Laitram, L.L.C., Harahan, LA (US)

( * ) Notice: Subject to any disclaimer, the term of this patent is extended or adjusted under 35 U.S.C. 154(b) by 8 days.

(21) Appl. No.: 15/884,556

(22) Filed: Jan. 31, 2018

(65) Prior Publication Data
US 2019/0233220 A1 Aug. 1, 2019

(51) Int. Cl.
*B65G 45/10* (2006.01)
*B65G 54/02* (2006.01)

(52) U.S. Cl.
CPC .......... *B65G 45/10* (2013.01); *B65G 54/02* (2013.01); *B65G 2201/0202* (2013.01); *B65G 2207/26* (2013.01)

(58) Field of Classification Search
CPC ................................ B65G 45/10; B65G 54/02
USPC .................. 198/494, 619; 104/281, 283, 286
See application file for complete search history.

(56) References Cited

U.S. PATENT DOCUMENTS

| 4,231,689 A | 11/1980 | Carstens |
| 4,595,870 A | 6/1986 | Chitayat |
| 4,742,778 A * | 5/1988 | Morishita ............ B61B 13/08 104/284 |
| 4,802,761 A * | 2/1989 | Bowen .................. G01N 21/03 356/246 |
| 5,251,741 A | 10/1993 | Morishita et al. |
| 5,287,026 A * | 2/1994 | Ogihara ................ B60L 13/10 104/281 |
| 5,473,992 A | 12/1995 | Takei |

(Continued)

FOREIGN PATENT DOCUMENTS

| GB | 2133757 B | 1/1987 |
| JP | 05-077921 A | 3/1993 |

(Continued)

OTHER PUBLICATIONS

US 2013/0186673 A1, Clavet et al., Jul. 25 (Year: 2013).*

(Continued)

*Primary Examiner* — Douglas A Hess
(74) *Attorney, Agent, or Firm* — James T. Cronvich

(57) ABSTRACT

A hygienic magnetic tray and conveyor. The low-profile tray includes a forcer sandwiched between an article-supporting top and an opposite bottom. The top is made of hygienic material, and the bottom can be made of a low-friction material. The tray is propelled along a guide surface on an enclosure housing stator coils supported in a conveyor frame. The stator forms a linear motor with the forcer in the tray. Various disposal systems provide escape routes for removing fluids and debris from the guide surface of the stator enclosure.

33 Claims, 13 Drawing Sheets

(56) References Cited

U.S. PATENT DOCUMENTS

| | | | |
|---|---|---|---|
| 5,881,649 A * | 3/1999 | Hasegawa | H01L 21/67709 104/166 |
| 5,886,432 A | 3/1999 | Markle | |
| 5,906,262 A * | 5/1999 | Miki | B65G 54/02 198/341.02 |
| 5,925,956 A * | 7/1999 | Ohzeki | F16C 29/00 310/12.06 |
| 5,965,963 A | 10/1999 | Chitayat | |
| 6,045,319 A | 4/2000 | Uchida et al. | |
| 6,097,014 A * | 8/2000 | Kirsch | H05B 6/12 219/621 |
| 6,250,230 B1 * | 6/2001 | Post | B61B 13/08 104/281 |
| 6,274,952 B1 | 8/2001 | Chitayat | |
| 6,397,990 B1 | 6/2002 | Brien et al. | |
| 6,531,793 B1 | 3/2003 | Frissen et al. | |
| 6,568,332 B1 * | 5/2003 | Holzinger | E01B 25/32 104/255 |
| 6,578,495 B1 | 6/2003 | Yitts et al. | |
| 6,580,185 B2 | 6/2003 | Kang et al. | |
| 6,684,794 B2 | 2/2004 | Fiske et al. | |
| 6,917,136 B2 * | 7/2005 | Thornton | H02K 1/08 310/180 |
| 7,458,454 B2 | 12/2008 | Mendenhall | |
| 7,730,840 B2 * | 6/2010 | Reichel | E01B 25/32 104/281 |
| 7,948,122 B2 | 5/2011 | Compter et al. | |
| 8,136,453 B2 * | 3/2012 | Hunter | A63G 3/02 104/60 |
| 8,193,886 B2 * | 6/2012 | Hahn | B60L 5/005 335/299 |
| 8,359,981 B2 * | 1/2013 | Hahn | B60L 13/03 104/281 |
| 8,407,915 B2 * | 4/2013 | George | F26B 3/347 34/259 |
| 8,485,350 B2 * | 7/2013 | Reinisch | B65G 54/02 104/281 |
| 8,528,486 B2 * | 9/2013 | Lee | B60L 13/04 104/281 |
| 8,967,051 B2 | 3/2015 | King et al. | |
| 9,032,880 B2 | 5/2015 | King et al. | |
| 9,045,183 B2 | 6/2015 | Laurence et al. | |
| 9,202,719 B2 | 12/2015 | Lu et al. | |
| 9,260,210 B2 | 2/2016 | Jacobs et al. | |
| 9,346,371 B2 | 5/2016 | King et al. | |
| 9,611,107 B2 | 4/2017 | Wernersbach et al. | |
| 9,685,849 B2 | 6/2017 | Lu et al. | |
| 9,701,488 B2 | 7/2017 | Paweletz | |
| 9,950,524 B2 * | 4/2018 | Shinkai | B41J 2/14233 |
| 2003/0011093 A1 | 1/2003 | Cser | |
| 2015/0083018 A1 | 3/2015 | Clark et al. | |
| 2017/0050332 A1 | 2/2017 | Bauer et al. | |
| 2017/0331359 A1 | 11/2017 | Paweletz et al. | |
| 2017/0341255 A1 | 11/2017 | Burk et al. | |

FOREIGN PATENT DOCUMENTS

| | | |
|---|---|---|
| JP | 07-228346 A | 8/1995 |
| WO | 2004011351 A2 | 2/2004 |
| WO | 2009083889 A1 | 7/2009 |
| WO | 2010-092473 A1 | 8/2010 |
| WO | 20188067567 A1 | 4/2018 |

OTHER PUBLICATIONS

International Search Report and Written Opinion of the International Searching Authority, PCT/US2019/015331, dated May 15, 2019, Korean Intellectual Property Office, Republic of Korea.

* cited by examiner

HYGIENIC MAGNETIC TRAY AND CONVEYOR

BACKGROUND

The invention relates generally to power-driven conveyors and in particular to magnetically driven tray conveyors.

Conventional conveying systems using flat belts, modular plastic or metal belts, gravity rollers, or powered rollers have many components. The number of harborage points for pathogens and toxins increases with the number of components. Because motors, gearboxes, roller bearings, shafts, pulleys, and sprockets can all collect food particles and harbor pathogens, they must be cleaned regularly. In food applications all the components must comply with strict food-use standards.

Some tray conveyors use linear-motor stators with coils propagating an electromagnetic wave along the conveyor to drive magnetic article-transporting trays. The stators are mounted in housings along the carryway. The top tray-supporting surface of the stator housing is flat. The flat surface can collect liquids that harbor contaminants.

SUMMARY

A conveyor tray embodying features of the invention comprises a top including an upper article-supporting face made of a first material, a bottom made of a second material and attached to the top, and a forcer between the top and the bottom. The top and the bottom are separate pieces.

One version of a tray conveyor embodying features of the invention comprises a tray driven by a linear-motor stator. The tray has a top and a bottom and a forcer between the top and the bottom. A conveyor frame having first and second sides supports the linear-motor stator. A stator enclosure housing the linear-motor stator is supported in the conveyor frame. A top guide surface is supported in the conveyor frame under the tray. The linear-motor stator propagates an electromagnetic wave along the length of the conveyor frame that interacts with the forcer in the tray to propel the tray in a conveying direction along the conveyor frame on or over the top guide surface. The stator enclosure includes through holes in the top guide surface to drain fluids and debris.

Another version of a tray conveyor comprises a tray driven by a linear-motor stator. The tray has a top and a bottom and a forcer between the top and the bottom. A first tray rail is supported along a first side of a conveyor frame, and a second tray rail is supported along a second side of the conveyor frame. The tray rails limit the lateral excursion of the tray. The linear-motor stator is supported in the conveyor frame. A stator enclosure housing the linear stator is supported in the conveyor frame. A top guide surface supports the tray. The linear-motor stator propagates an electromagnetic wave along the length of the conveyor frame that interacts with the forcer in the tray to propel the tray in a conveying direction along the conveyor frame on or over the top guide surface. A disposal system is provided through which the tray pushes fluids or debris from the top guide surface.

DETAILED DESCRIPTION OF THE DRAWINGS

DETAILED DESCRIPTION

Figure 1:
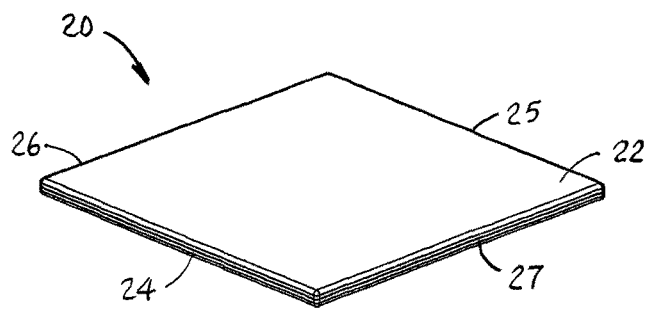
FIG. 1 is an isometric view of a tray conveyor embodying features of the invention.
Figure 2:
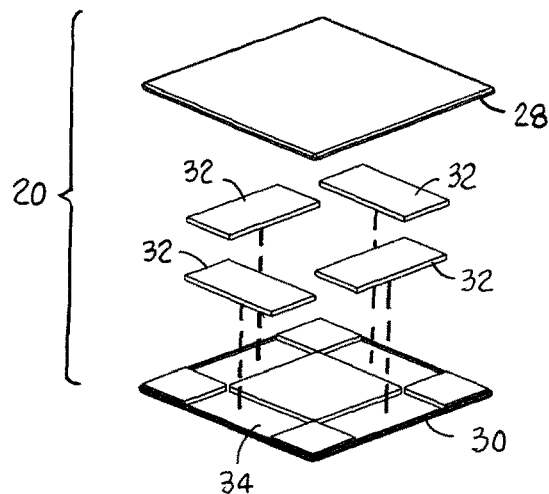
FIG. 2 is an exploded isometric view of the tray of FIG. 1.

A magnetic conveyor tray for a tray conveyor is shown in FIGS. 1 and 2. The tray 20 is a low-profile, four-sided disk, or plate, with a flat upper article-supporting face 22. The tray 20 extends in length from a first end 24 to a second end 25 and in width from a first side 26 to a second side 27. The length and width of the low-profile tray 20 are much greater than the tray's thickness top to bottom.

As shown in FIG. 2, the tray 20 is constructed of a top 28 and a bottom 30. Permanent-magnet arrays 32, sandwiched between the top 28 and the bottom 30, form a forcer. The bottom 30 has recesses 34 in which the magnet arrays 32 reside. Although the top 28 and the bottom 30 can be made of the same material, they can also be made of different materials. For example, the top 28 can be made of a hygienic material for contact with food articles, and the bottom 30 can be made of a low-friction material for low-friction sliding. The materials can be plastics or ceramics, for example. Examples of hygienic plastic materials for the top 28 are:

polyethylene terephthalate (PET, or PETE), high-density polyethylene (HDPE), and polystyrene (PS). Examples of low-friction plastic materials for the bottom 30 are: polyoxymethylene (POM, acetal), polypropylene (PP), and ultra-high-molecular-weight polyethylene (UHMW). The magnet arrays 32 can be made of metal or ceramics, but can also be made of plastic magnet material as are refrigerator magnets, as a few examples.

The top 28 may be attached to the bottom 30 by injection co-molding the two pieces around the magnet arrays 32. Or the top 28 can be overmolded onto the bottom 30 and the magnet arrays 32. The top 28 and the bottom can alternatively be attached by adhesives, welds, or mechanical fasteners, including snap-on fasteners, as a few examples.

Figure 3:
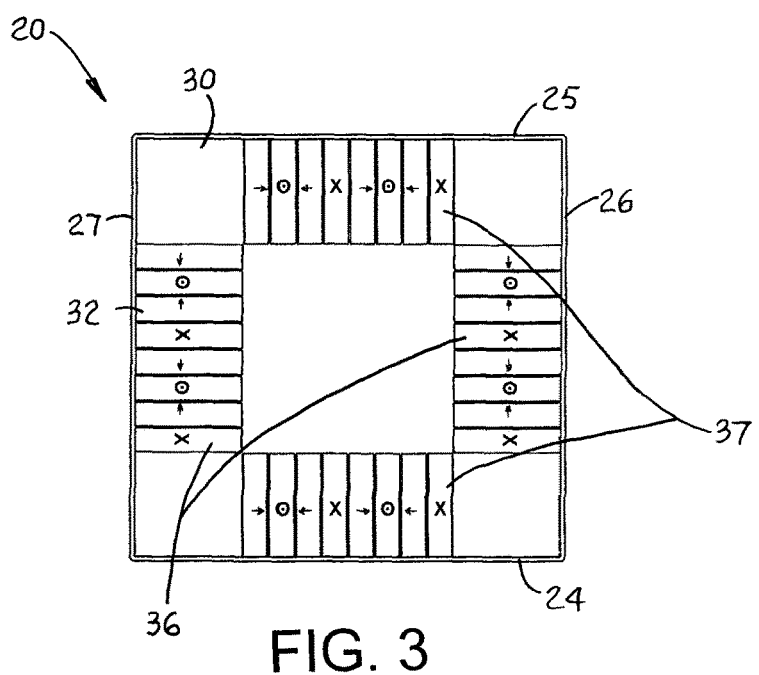
FIG. 3 is a bottom view of the tray of FIG. 1 showing Halbach magnet arrays.

FIG. 3 shows one arrangement of the magnet arrays 32 as forcers. The four magnet arrays 32 are arranged in pairs 36, 37 of parallel arrays. The first pair 36 extends in length along the first and second sides 26, 27 of the tray 20, and the second pair 37 extends in length along the first and second ends 24, 25. The first pair 36 of parallel magnet arrays 32 is orthogonal to the second pair 37. Each of the arrays 32 is shown as a Halbach array to increase the magnetic field directed downward normal to the bottom 30 of the tray 20. But the magnet arrays 32 could alternatively be magnetized with north and south poles alternating along their lengths. Or the magnet arrays can be arranged in a checkerboard pattern of permanent magnets N, S of alternating polarities as in FIG. 21. The rows and columns of the checkerboard pattern are oriented at 45° relative to the sides of the tray 186. The checkerboard array can be converted into a Halbach array by placing magnets whose polar axes lie in the plane of the array, rather than perpendicular to it, between adjacent magnets N, S on all sides. In any case the magnet arrays 32 can be magnetized after the top 28 and the bottom 30 are joined. Otherwise the magnet arrays 32 can be magnetized with their predetermined field pattern before construction of the tray 20. And, although the tray 20 is shown with four magnet arrays 32, the tray could alternatively be constructed with only one pair of magnet arrays, either the first pair 36 or the second pair 37, if the tray has to travel only either end first or side first. In some configurations, only a single magnet array 32 would suffice. Instead of magnet arrays, the forcer could be made of electrically conductive elements or of a linear array of soft iron forming poles.

Figure 4:
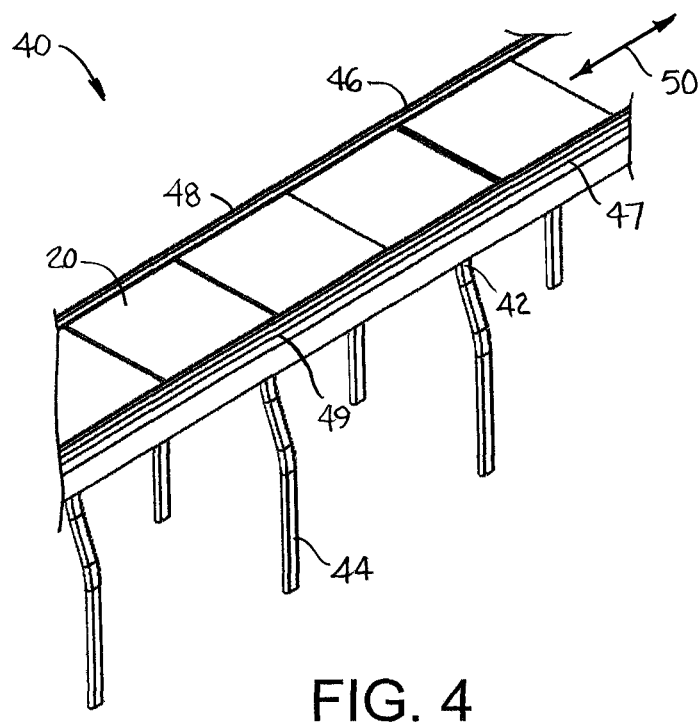
FIG. 4 is an isometric view of a portion of a tray conveyor using trays as in FIG. 1.
Figure 5:
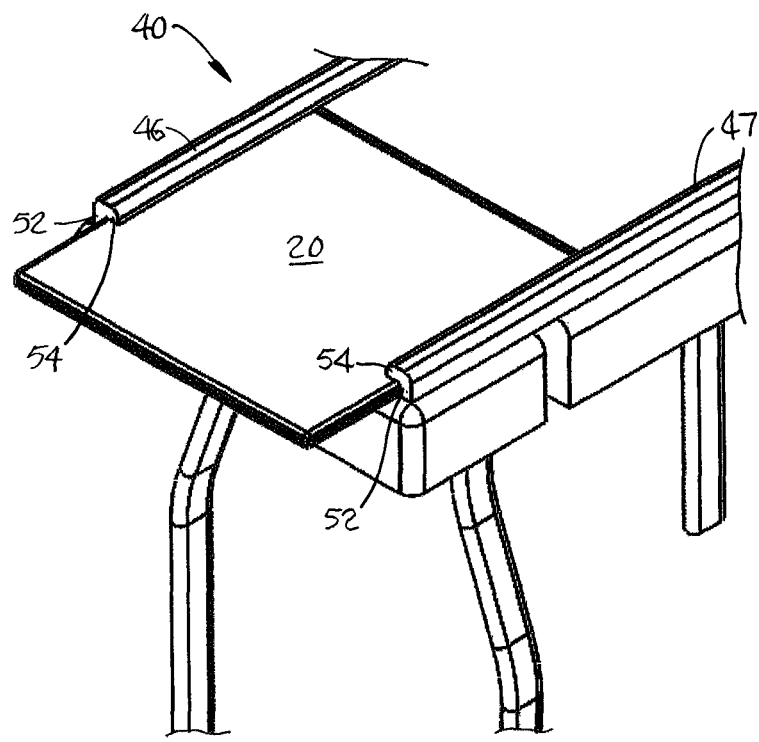
FIG. 5 is an enlarged view of a portion of the tray conveyor of FIG. 4.

A portion of a tray conveyor for the tray 20 of FIG. 1 is shown in FIG. 4. The conveyor 40 comprises a conveyor frame 42 having legs 44 and tray rails 46, 47 along first and second sides 48, 49 of the frame 42. The tray rails 46, 47 define a conveying path for the trays 20 in a bidirectional conveying direction 50. As shown in FIG. 5, the tray rails 46, 47, like angle brackets, are each in the shape of an inverted L with a vertical side wall 52 and a cantilevered overhang 54. The side walls 52 limit the lateral horizontal excursion, or drift, of the trays 20. The overhangs 54 limit the vertical excursion of the trays 20. In this way the low-profile trays 20 are confined to the conveying path.

Figure 6:
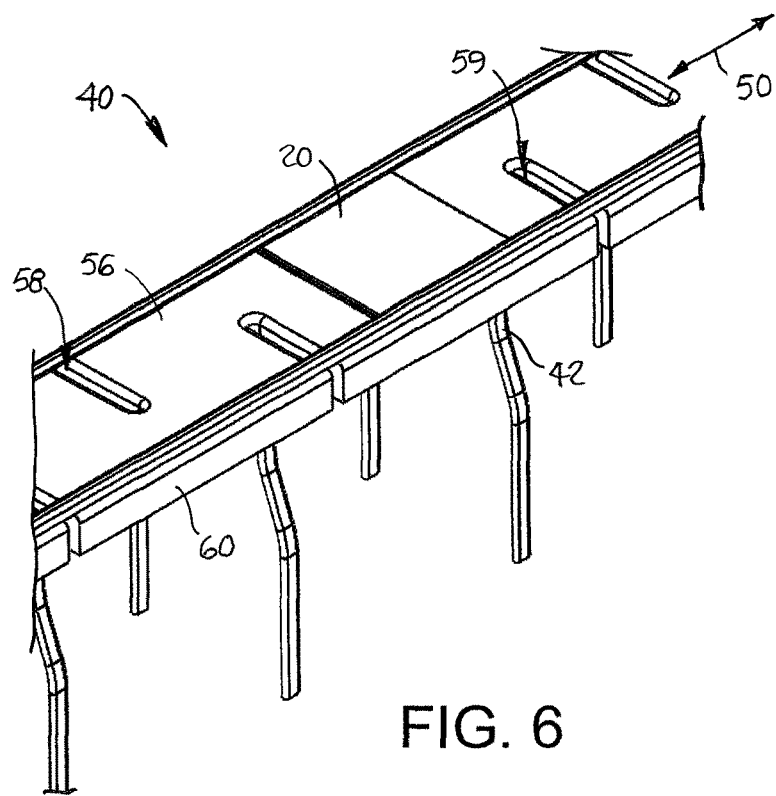
FIG. 6 is an isometric view of the tray conveyor of FIG. 4 with only a single tray.
Figure 7:
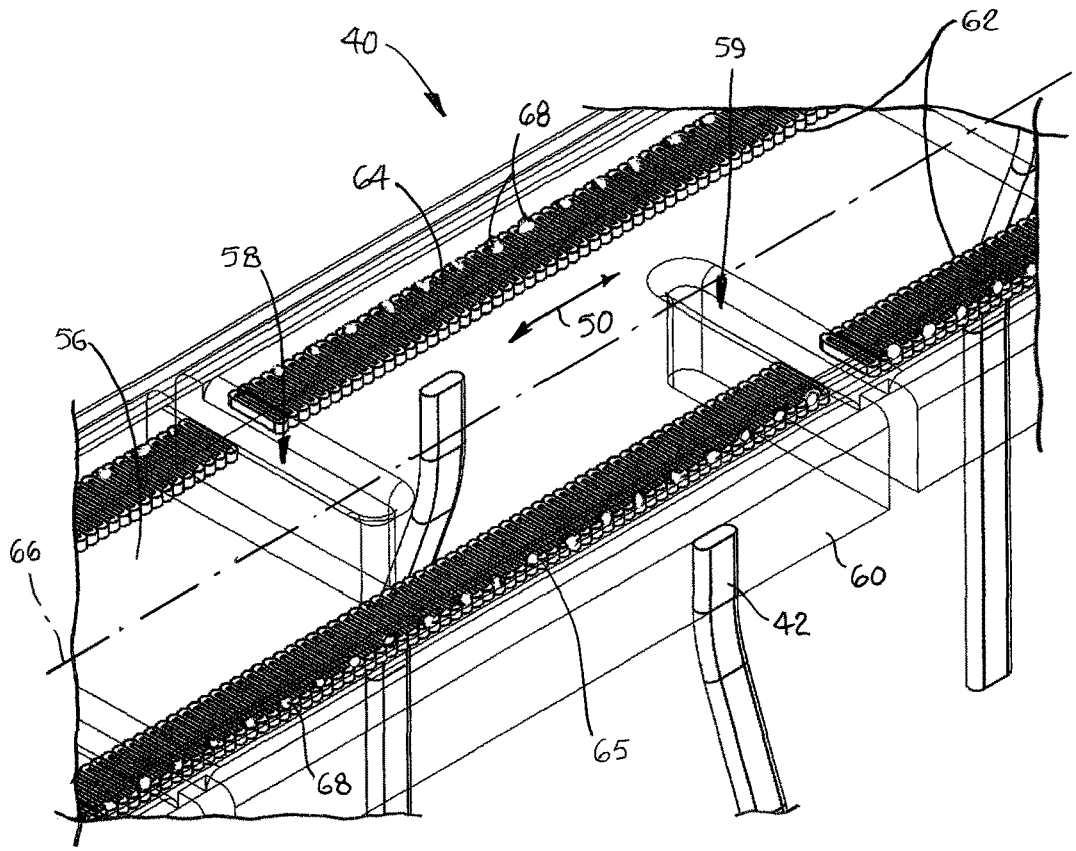
FIG. 7 is an isometric view of a portion of the tray conveyor of FIG. 4 with the stator housing in phantom and showing one version of drainage holes.

As shown in FIG. 6, the tray conveyor 40 has a top guide surface 56 supported in the conveyor frame 42 on or over which the trays 20 ride. The guide surface 56 can be a slide surface for trays 20 that ride along in sliding contact with the surface. If the trays are levitated, they ride slightly above the underlying guide surface 56 without contact. The guide surface 56 is smooth with through holes 58, 59 opening onto it. In this version the through holes 58, 59 are in the form of slots elongated in a lateral direction perpendicular to the conveying direction 50. As further shown in FIG. 7, the through holes 58, 59 extend all the way through the thickness of enclosures 60, each housing a linear-motor stator 62 that includes left and right stator coils 64, 65 forming a double stator. The left and right stator coils 64, 65 are interrupted by the elongated slots 58, 59. The left slots 58 alternate with the right slots 59 along the length of the conveyor 40. The slots 58, 59 extend laterally inward from the left and right sides 48, 49 of the conveyor frame 42 past the centerline 66 of the conveyor 40. The left and right slots 58, 59 overlap in the conveying direction 50. The slots 58, 59 form a disposal system that provides egress for fluids and debris from the guide surface 56. In this version and in all other versions of tray conveyors subsequently described, the top guide surface 56 can be integral with and form part of the stator enclosure, or it can be a separate component, such as a sheet, on or over which the trays ride above the stator. In either case the guide surface is disposed between the linear-motor stator 62 and the trays 20.

The left and right stators 64, 65 each propagate an electromagnetic flux wave in the conveying direction 50. The stators 64, 65 are conventionally driven by three-phase coil controllers (not shown). The stator 62 can be separated along the length of the conveyor 40 into a series of stator zones, each driven by an independent coil control to provide independent zone control of the trays 20. The left stator coils 64 are spaced apart laterally from the right stator coils 65 the same distance as the magnet arrays 32 of the first pair 36 in the tray 20 of FIG. 3. In that way the magnet arrays 36 in the tray 20 are aligned with and close to the left and right stators 64, 65 in the conveyor frame 42 for maximum magnetic coupling. And the left and right stator coils are spaced so as to advantageously interact with the pole pitch of the magnet arrays 32. The traveling electromagnetic flux wave generated by the stator 62 interacts with the magnetic fields of the tray's magnet arrays 32 to produce a repulsive force that propels the trays 20 along the top guide surface 56 in the conveying direction 50. Thus, the stators form a linear synchronous motor with the magnet arrays. If the forcer is instead made of electrically conductive elements, the stator forms a linear induction motor with the forcer. If the forcer is made of a linear array of soft iron forming poles, the stator forms a linear variable-reluctance motor with the forcer.

Position sensors 68 positioned periodically along the length of the conveyor 40 at spaced apart positions sense the presence of a tray at their positions as the tray passes by. The position sensors 68 can be, for example, Hall-effect devices that sense the magnetic field of the magnet arrays in the trays 20. The outputs of the position sensors are used to control the energization of the stator 62. Some examples of other position sensors are: (a) capacitive sensors sensing the change in the electric field caused by a passing tray; (b) optical sensors, such as photo eyes or light curtains; (c) cameras and visioning systems; (d) radar; (e) induced eddy-current sensors; (f) ultrasonic sensors; and (g) reed switches. The stator coils 64, 65 are wound around ironless cores to reduce friction between the tray 20 and the top guide surface 56 that would be caused by attraction to the tray's magnet arrays. If friction is not a problem, iron cores can be used.

Figure 8:
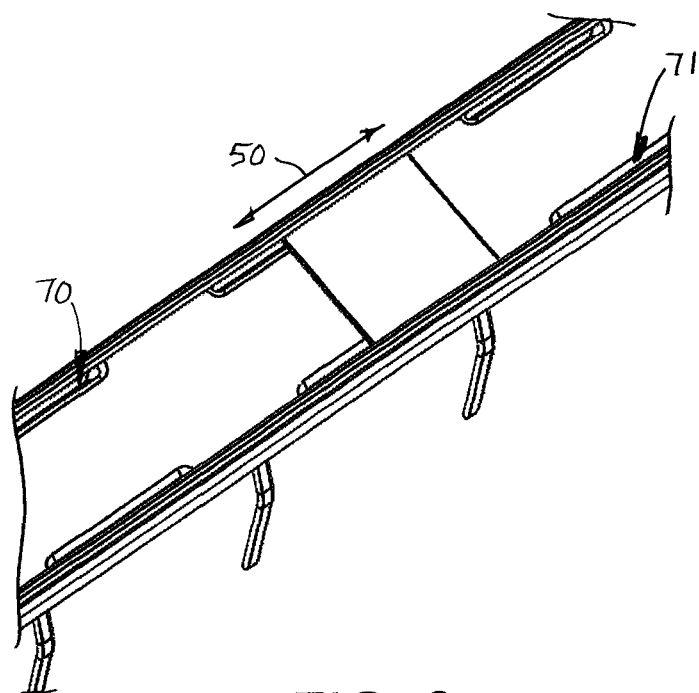
FIG. 8 is an isometric view of a portion of a conveyor as in FIG. 4 with another version of drainage holes.
Figure 9:
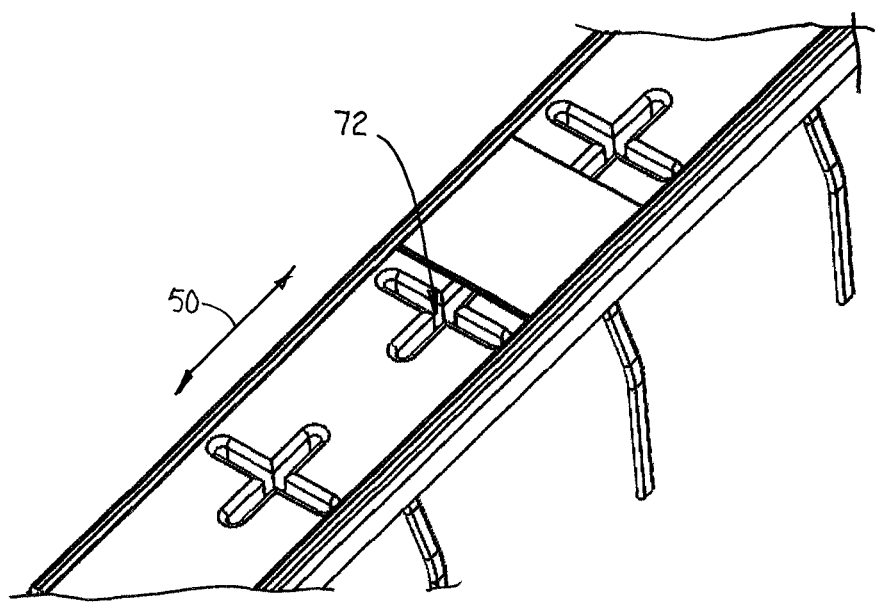
FIG. 9 is an isometric view of a portion of a tray conveyor as in FIG. 4 with yet another version of drainage holes.

As shown in FIGS. 8 and 9, alternative through-hole patterns can be used in the disposal system. In FIG. 8, for example, left and right through holes 70, 71 are slots elongated in the conveying direction 50 and positioned along the sides of the conveyor to serve as gutters. In this version the left and right elongated slots 70, 71 are aligned across the width of the conveyor, but they could be staggered. Through holes 72 in the conveyor of FIG. 9 are cruciform in shape with slotted arms elongated in the conveying direction 50 intersecting slotted arms elongated in the direction perpendicular to the conveying direction. Other hole shapes are possible. For example, round, elliptical, oval, or polygonal through holes could be used. Or the disposal system could include other discontinuities or breaks in the top guide surface 56 and the stator enclosures, such as gaps between consecutive linear-stator enclosures.

Figure 10A:
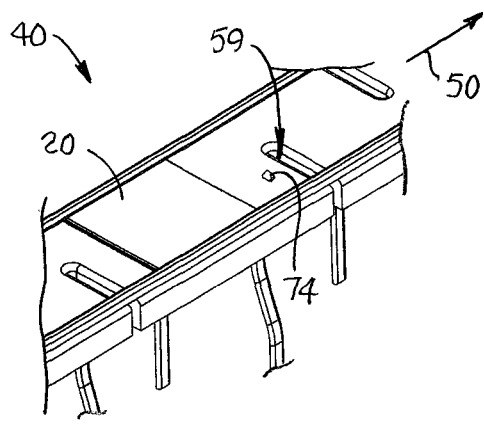
FIGS. 10A-10C are isometric views of a portion of a conveyor as in FIG. 6 showing a sequence of steps in which a tray sweeps debris from the conveyor.
Figure 10B:
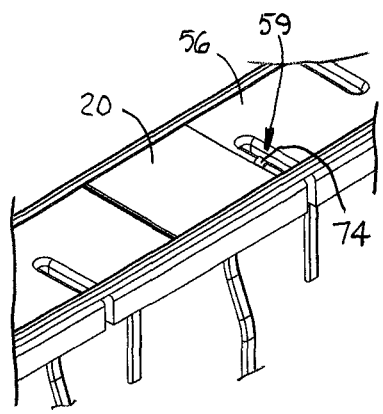
Figure 10C:
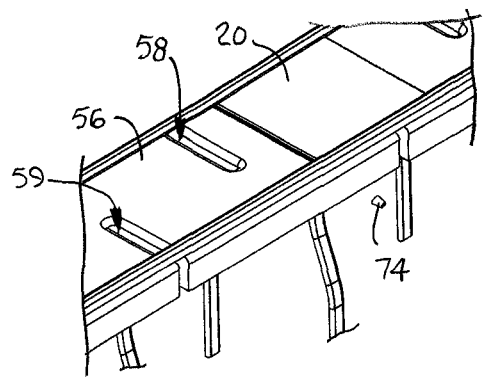
Figure 11:
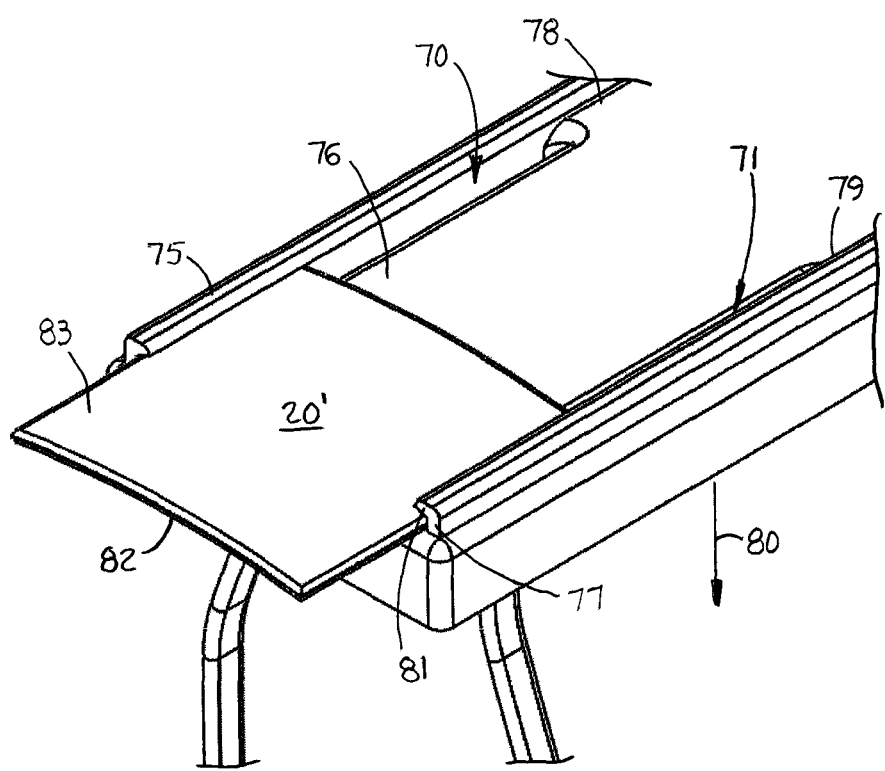
FIG. 11 is an end view of a tray conveyor as in FIG. 4, but with a crowned stator housing and a concave tray bottom.

FIGS. 10A-10C depict the operation of the disposal system. A tray 20 removes debris 74 from the conveyor 40 by sweeping it into a through hole 59. In FIG. 10A the tray 20 is shown advancing in the conveying direction 50 toward the debris 74. In FIG. 10B the tray 20 is shown pushing the debris 74 along the conveyor's top guide surface 56 into the elongated slot 59. In FIG. 10C the debris 74 is shown falling from the slot as the tray 20 passes by. The tray 20 also sweeps fluids that build up on the top guide surface 56 into the through holes 58, 59 to drain. To further assist with the drainage of fluids, especially with side gutters 70, 71 as in FIG. 8, the top guide surface 56 can be crowned as in FIG. 11. The crowned top guide surface 76 drains toward the sides 78, 79 and exits through the through holes 70, 71 indicated by the arrow 80. The bottom 82 of the tray 20' has a concave contour to complement the convex shape of the crowned guide surface 76. The top 83 of the tray 20' can be convex, as shown, flat, or contoured. If the top 83 is curved across its entire width, the angle between the overhang 81 and the wall 77 of the tray rails 75 would have to be slightly greater than 90° to accommodate the curve.

Figure 12:
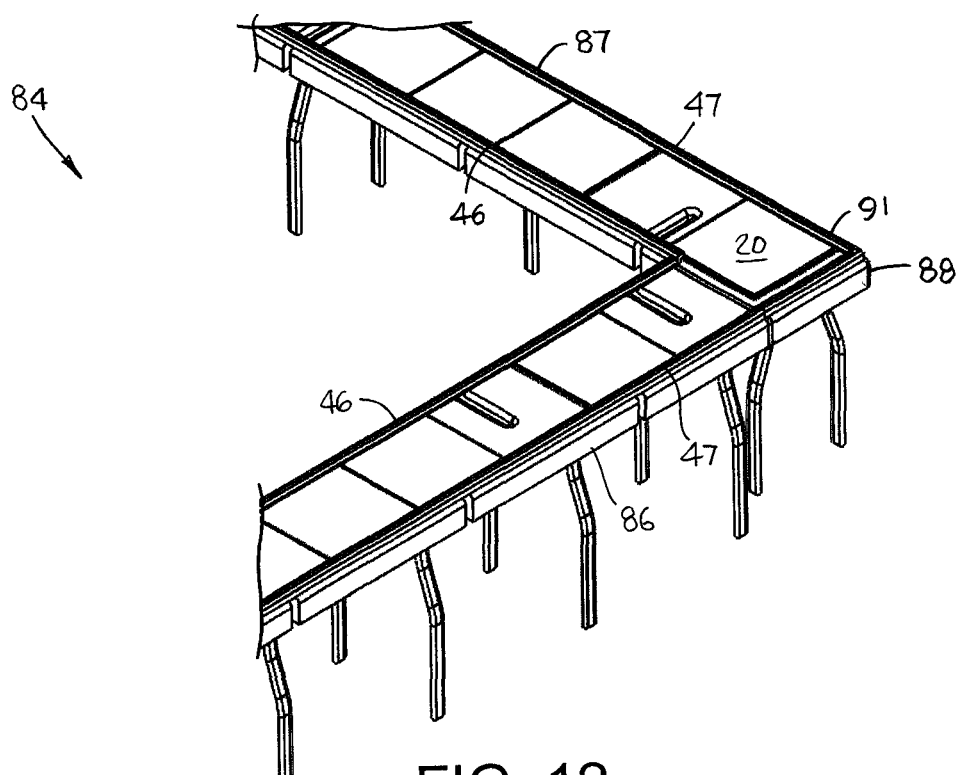
FIG. 12 is an isometric view of a portion of a tray conveyor as in FIG. 4 with a corner section.
Figure 13:
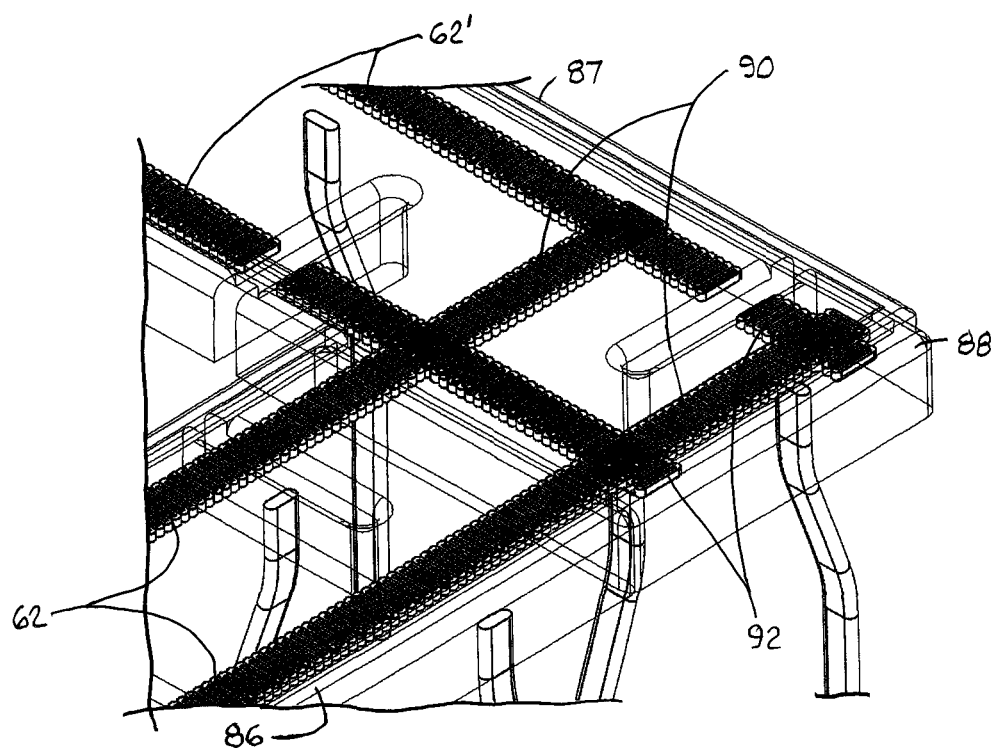
FIG. 13 is an enlarged view of the corner section of FIG. 12 with the stator housing in phantom.

One corner of a tray conveyor 84 with a 90° turn is shown in FIGS. 12 and 13. The conveyor includes a first conveyor section 86 and a second conveyor section 87 perpendicular to the first conveyor section. In this example the left tray rails 46 of the two sections 86, 87 abut at adjacent ends and so are continuous. A junction section, in particular, a corner section 88, joins the first section 86 to the second section 87. The corner section 88 has an outside tray rail 91 composed of two right-angle segments that align with the right tray rails 47 of the two sections 86, 87. The corner section 88 serves as an x-y translator with a first stator 90 having coils in series and aligned with the coils of the stator 62 in the first section 86 and a second stator 92 having coils in series and aligned with the coils of the stator 62' in the second section 87. The first and second stators are perpendicular to each other for the 90° turn. When the tray 20 enters the corner section 88 from the first conveyor section 86, its first magnet array 36 (FIG. 3) is vertically aligned with the first stator coils 90. When the tray 20 is fully on the corner section 88, the first stator 90 is de-energized to halt the motion of the tray. In that position the second magnet array 37 (FIG. 3) of the tray 20 is vertically aligned with the second stator coils 92, which are energized to translate the tray onto the second conveyor section 87. (A corner section is just one kind of junction section, in which the direction of travel of a tray can be changed. Other versions include junction sections at a three-way intersection or a T-junction and junction sections at four-way intersections.

Figure 21:
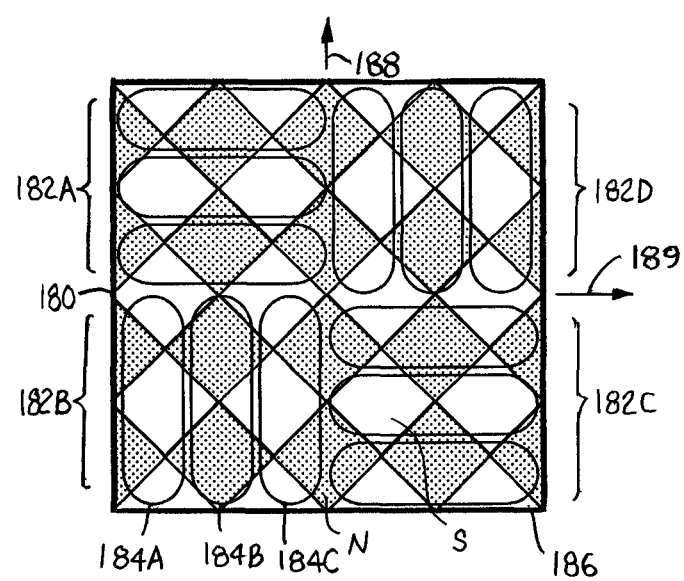
FIG. 21 is a transparent plan view of a magnetic tray with a checkerboard array of magnets over a corner section of a tray conveyor.

Another version of a corner section used with a checkerboard array of tray magnets N, S is depicted in FIG. 21. The corner section 180 is shown with four sets 182A-182D of three-phase coils 184A-184C. First diagonally opposite sets 182A, 182C are arranged perpendicular to second diagonally opposite sets 182B, 182D. The first sets 182A, 182C propagate electromagnetic flux waves that interact with the obliquely oriented checkerboard array of magnets N, S in the tray 186 to drive the tray in a first direction 188. The second sets 182B, 182D propagate electromagnetic flux waves that interact with the checkerboard array to drive the tray 186 in a second direction 189 perpendicular to the first direction 188. Each three-coil set 182A-182D extends over two tray-magnet periods 190. The coils 184A-184C can also be operated to levitate the tray 186.

Figure 14A:
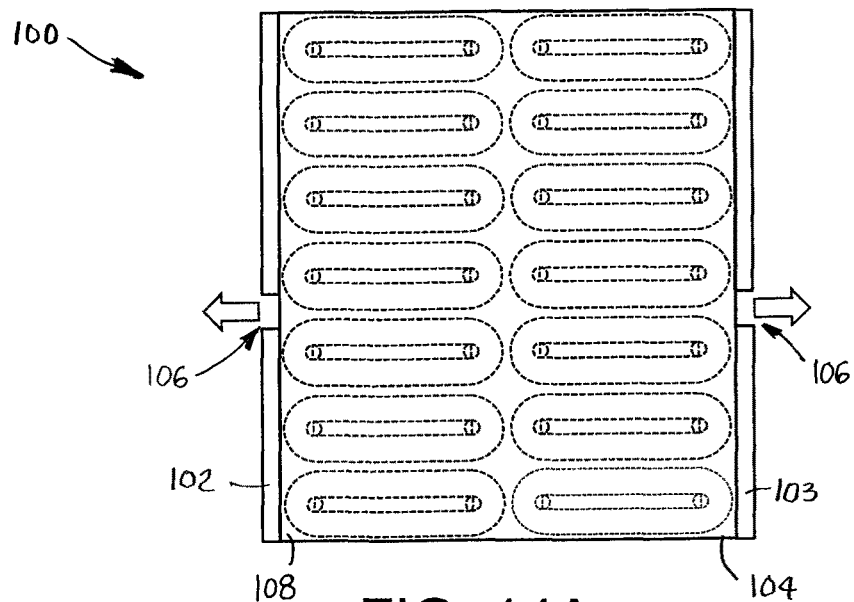
FIGS. 14A and 14B are top plan and front elevation views of a portion of a tray conveyor as in FIG. 4 with gaps in the tray rails.
Figure 14B:
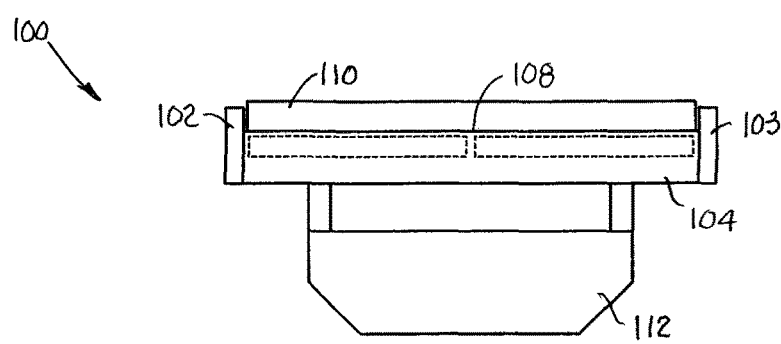
Figure 15:
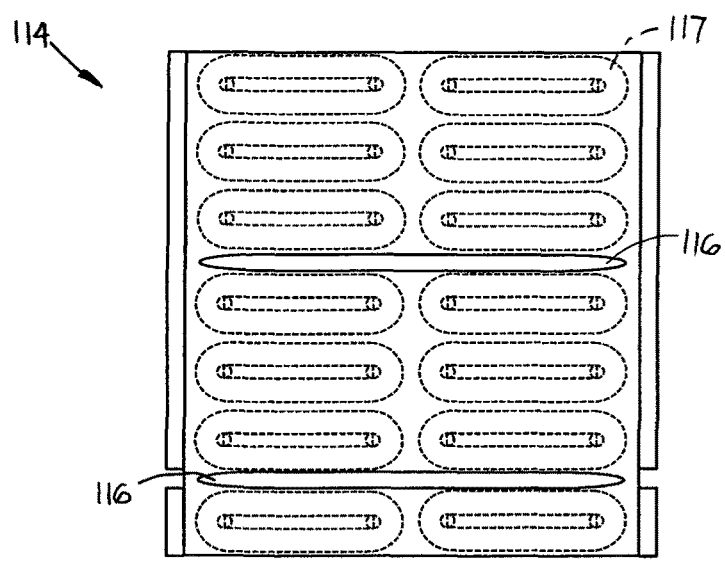
FIG. 15 is a top plan view of a tray conveyor as in FIG. 14A with through holes for disposal of debris.

Another version of a disposal system in a tray conveyor is shown in FIGS. 14A and 14B. The tray conveyor 100 has tray rails 102, 103 abutting a stator enclosure 104 along each side. Gaps 106 at spaced apart locations along the length of the tray conveyor 100 form the disposal system by providing for the escape of fluids that collect on a top guide surface 108 of the stator enclosure 104. A tray 110 helps push fluids through the gaps 106. The tray conveyor 100 is supported in a conveyor frame 112. The tray conveyor 114 in FIG. 15 uses laterally elongated through holes 116 spaced apart along the length of the conveyor in its disposal system. The shape of the through holes 116 through the top guide surface 108 and the stator enclosure 104 is designed to minimize the area of the top guide surface not directly above the stator coils 117.

Figure 16A:
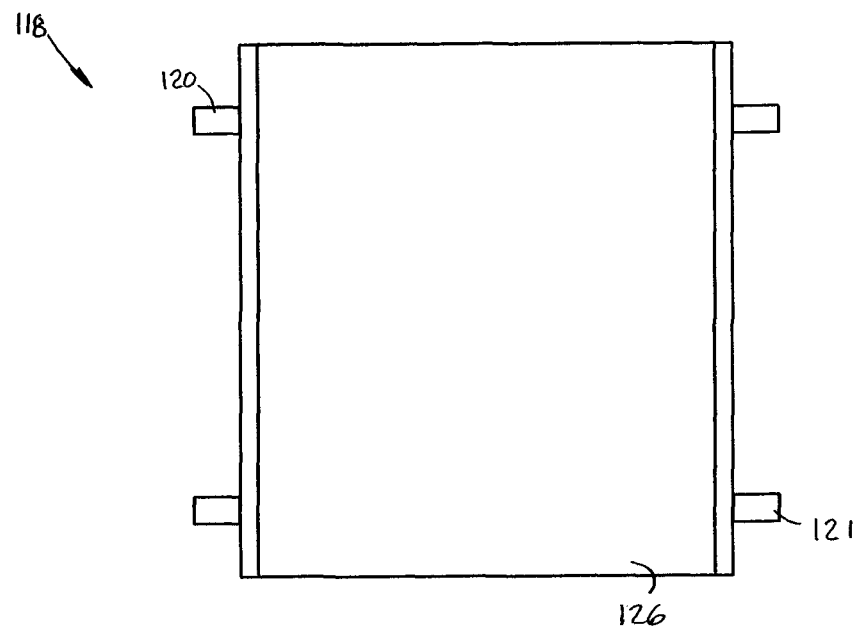
FIGS. 16A and 16B are top plan and front elevation views of a portion of another version of a tray conveyor having disposal gaps below the tray rails.
Figure 16B:
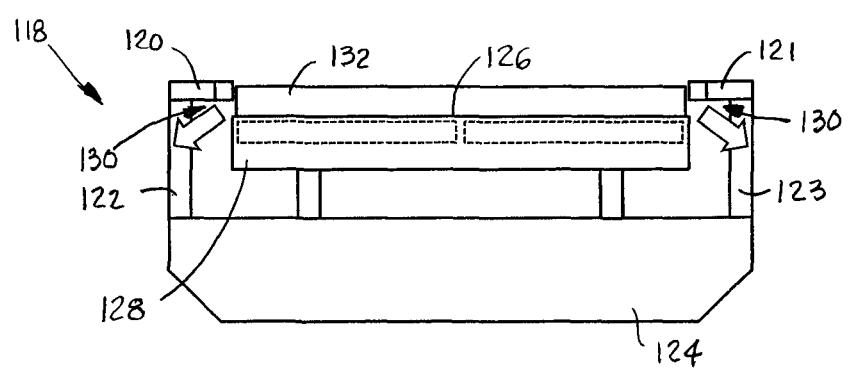
Figure 17:
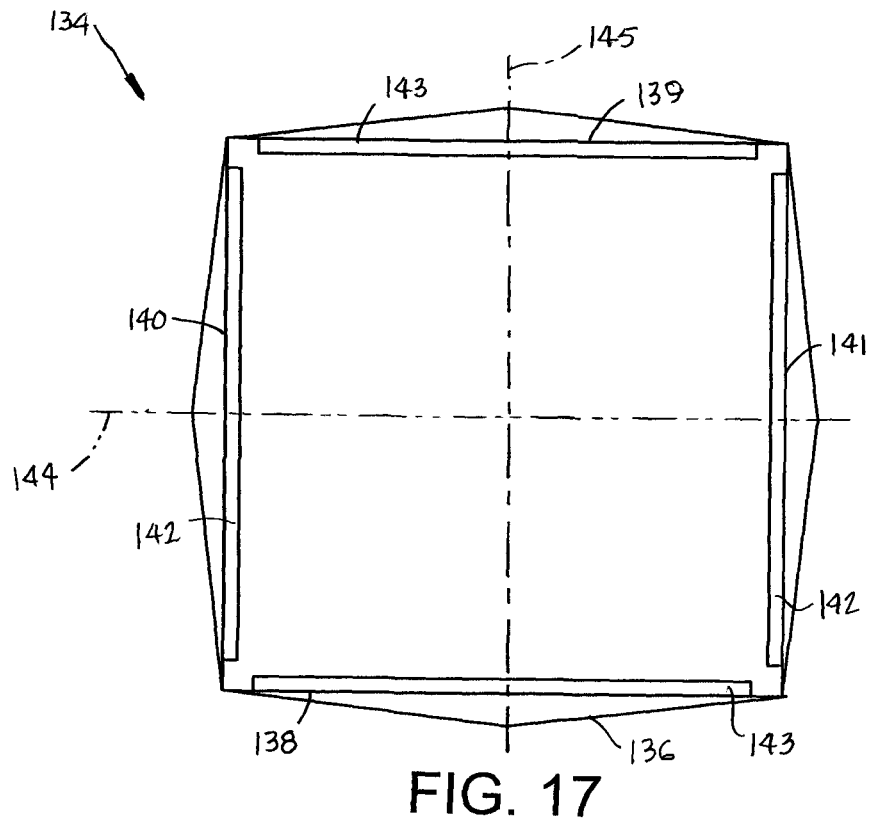
FIG. 17 is a top plan view of another version of a tray embodying features of the invention including V-shaped sides and ends and top walls.
Figure 18:
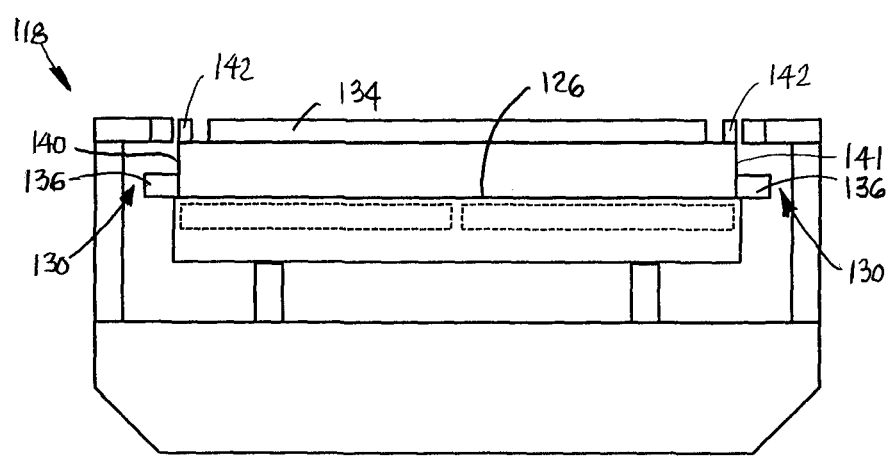
FIG. 18 is a front elevation view of a portion of a tray conveyor as in FIG. 16A adapted for a tray as in FIG. 17.

In the tray conveyor 118 of FIGS. 16A and 16B, tray rails 120, 121 are supported on vertical supports 122, 123 in a conveyor frame 124. The tray rails 120, 121 are positioned above the level of a top guide surface 126 and a stator enclosure 128. Gaps 130 below the tray rails 120, 121 form a disposal system through which fluids and debris are pushed by trays 132. The tray conveyor 118 of FIGS. 16A and 16B is shown in FIG. 18 with a tray 134 as in FIG. 17 having a skewed or V-shaped skirt 136 on its front and rear ends 138, 139 and its left and right sides 140, 141. The skirts 136 on the sides 140, 141 gather and push debris into the gaps 130 as the tray 134 rides along the top guide surface 126. Side walls 142 extending up from the top of the tray 134 along the left and right sides 140, 141 cooperate with the tray rails 120, 121 to limit the lateral drift of the tray. Together with end walls 143 on the front and rear ends 138, 139, the side walls confine articles on the tray 134. The tray 134 can be used with other of the tray conveyors described. In this version the tray 134 is square—symmetrical about lateral and longitudinal axes 144, 145—so that front, rear, left, and right are interchangeable. But the tray could be non-square—rectangular, for example—for use with wide conveyor sections that extend in length in a first direction joined by rectangular junction sections to narrow conveyor sections that extend in length perpendicular to the first direction.

Figure 19A:
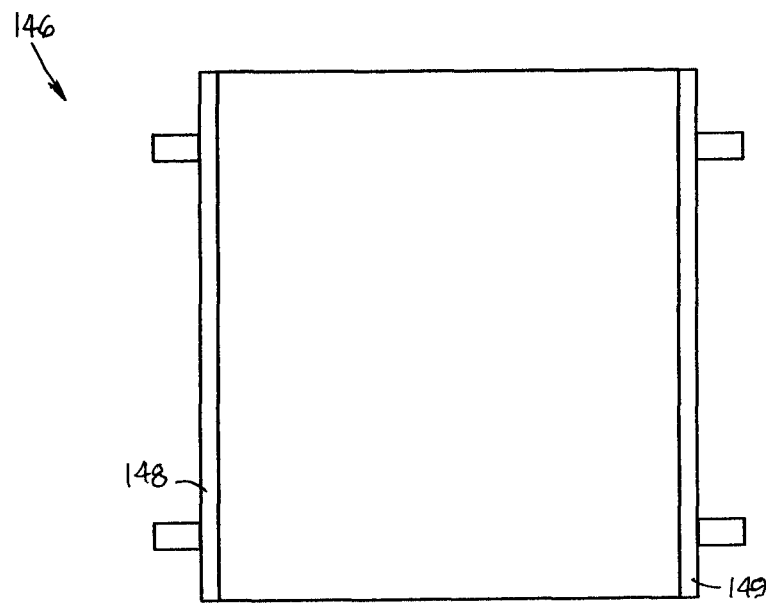
FIGS. 19A and 19B are top plan and front elevation views of a portion of another version of a tray conveyor having spring-loaded tray rails.
Figure 19B:
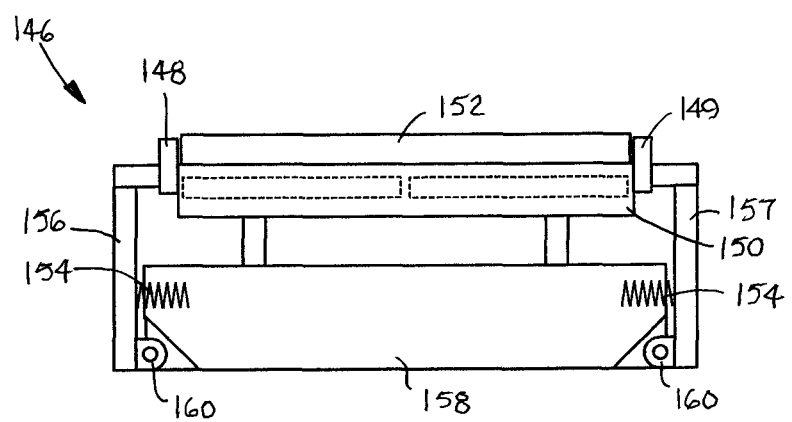

Another version of a tray conveyor is shown in FIGS. 19A and 19B. The tray conveyor 146 is similar to that of FIGS. 16A and 16B, except that tray rails 148, 149 abut the sides of the stator enclosure 150 and limit the lateral drift of the tray 152. And the tray rails 148, 149 are biased inward toward the enclosure 150 and the tray 152 by springs 154 connected between tray-guide supports 156, 157 and the conveyor frame 158. The spring bias is light enough that debris between the side of the tray 152 and the tray rails 148, 149 forces the supports 156, 157 to pivot outward on hinges 160 to open gaps between the tray rails 148, 149 and the sides of the stator enclosure 150 through which debris and fluids can be disposed.

Figure 20A:
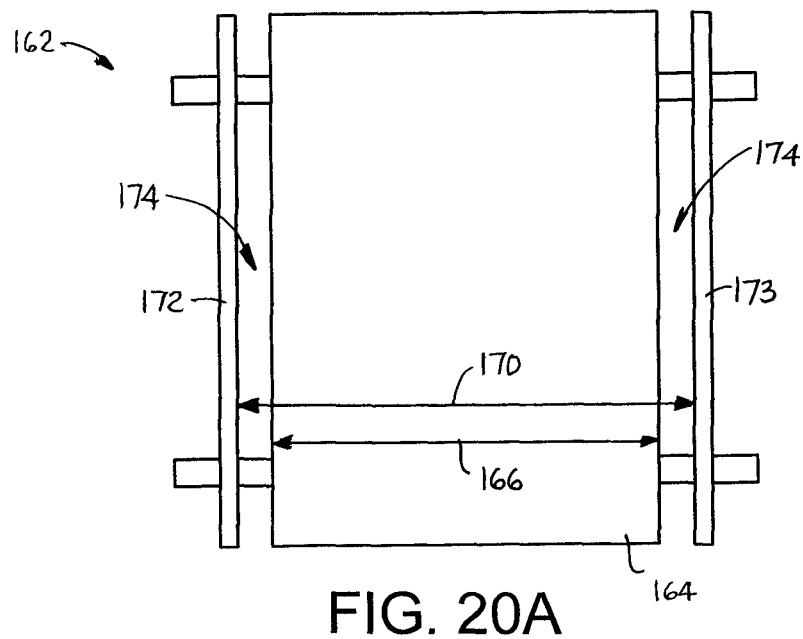
FIGS. 20A and 20B are top plan and front elevation views of a portion of another version of a tray conveyor having a top guide surface narrower than the trays.
Figure 20B:
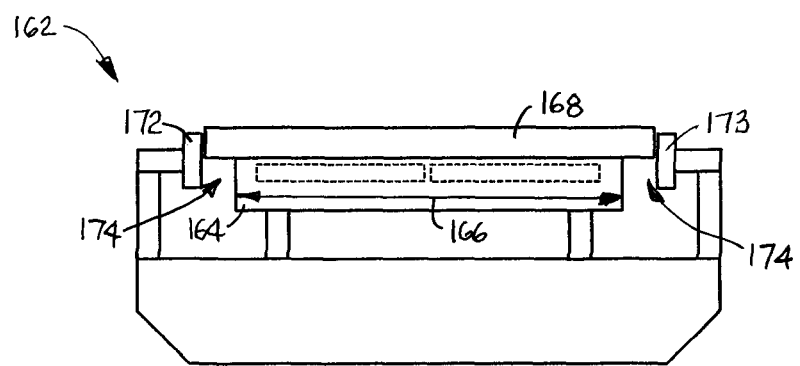

Yet another example of a tray conveyor with a disposal system is shown in FIGS. 20A and 20B. In this version a tray conveyor 162 supports a stator enclosure 164 whose lateral width 166 is less than the width of the tray 168 and the distance 170 between left and right tray rails 172, 173. Longitudinal gaps 174 along each side of the tray conveyor 162 provide an escape route for fluids and debris.

What is claimed is:

1. A conveyor tray comprising:
   a top made of a first material and including an upper article-supporting face;
   a bottom made of a second material and attached to the top;
   a forcer between the top and the bottom;
   wherein the top and the bottom are separate pieces; and
   wherein the forcer includes one or more magnet arrays magnetized with a predetermined field pattern after the top and the bottom are attached.

2. A conveyor tray as in claim 1 wherein the top and the bottom are co-molded around the forcer.

3. A conveyor tray as in claim 1 wherein the top is overmolded onto the bottom and the forcer.

4. A conveyor tray as in claim 1 wherein the first material is a first plastic material and the second material is a different second plastic material.

5. A conveyor tray as in claim 4 wherein the first plastic material is a hygienic material such as polyethylene terephthalate (PET, or PETE), high-density polyethylene (HDPE), or polystyrene (PS).

6. A conveyor tray as in claim 4 wherein the second plastic material is a low-friction material such as polyoxymethylene (POM, acetal), polypropylene (PP), or ultra-high-molecular-weight polyethylene (UHMW).

7. A conveyor tray as in claim 1 wherein the one or more magnet arrays are plastic magnet arrays.

8. A conveyor tray as in claim 1 wherein the forcer comprises four magnet arrays arranged in first and second pairs of parallel magnet arrays wherein the first pair is orthogonal to the second pair.

9. A conveyor tray as in claim 1 wherein the one or more magnet arrays are arranged in a checkerboard pattern.

10. A conveyor tray as in claim 1 wherein the bottom has a concave lower face.

11. A conveyor tray as in claim 1 further comprising front and rear ends and left and right sides and a skewed skirt extending outward from each of the front and rear ends and each of the left and right sides.

12. A tray conveyor comprising:
    a tray including a top and a bottom and a forcer between the top and the bottom;
    a conveyor frame having first and second sides;
    a first tray rail supported in the conveyor frame along the first side and a second tray rail supported in the conveyor frame along the second side to limit the lateral excursion of the tray;
    a linear-motor stator supported in the conveyor frame;
    a stator enclosure housing the linear-motor stator supported in the conveyor frame;
    a top guide surface supported in the conveyor frame under the tray;
    wherein the linear-motor stator propagates an electromagnetic wave along the length of the conveyor frame that interacts with the forcer in the tray to propel the tray in a conveying direction along the conveyor frame on or over the top guide surface; and
    wherein a disposal system is provided to provide egress through which the tray pushes fluids or debris from the top guide surface.

13. A tray conveyor as in claim 12 wherein the disposal system includes discontinuities in the top guide surface and the stator enclosure providing the egress through which fluids or debris can escape from the top guide surface.

14. A tray conveyor as in claim 12 wherein the disposal system includes through holes extending through the top guide surface and the stator enclosure providing the egress through which fluids or debris can escape from the top guide surface.

15. A tray conveyor as in claim 12 wherein the disposal system includes gaps in the first and second tray rails providing the egress through which fluids or debris can escape from the top guide surface.

16. A tray conveyor as in claim 12 wherein the disposal system includes vertical supports spaced apart along the conveyor frame supporting the first and second tray rails above the level of the top guide surface to form a gap between each of the first and second tray rails and the top guide surface providing the egress through which fluids or debris can escape from the top guide surface.

17. A tray conveyor as in claim 16 further comprising springs connected between the conveyor frame and the vertical supports lightly biasing the first and second tray rails toward the tray so that debris pushed to the first or second side by the tray widens the gap by forcing the first or second tray rail away from the tray against the spring bias.

18. A tray conveyor as in claim 16 wherein the width of the top guide surface and the stator enclosure is less than the distance between the first and second tray rails and the width of the tray.

19. A tray conveyor comprising:
    a tray including a top and a bottom and a forcer between the top and the bottom;
    a conveyor frame having first and second sides;
    a linear-motor stator supported in the conveyor frame;
    a stator enclosure housing the linear-motor stator supported in the conveyor frame;
    a top guide surface supported in the conveyor frame under the tray;
    wherein the linear-motor stator propagates an electromagnetic wave along the length of the conveyor frame that interacts with the forcer in the tray to propel the tray in a conveying direction along the conveyor frame on or over the top guide surface; and
    wherein the top guide surface and the stator enclosure include through holes to drain fluids and debris.

20. A tray conveyor as in claim 19 wherein the through holes are elongated slots.

21. A tray conveyor as in claim 20 wherein the elongated slots are elongated in the conveying direction.

22. A tray conveyor as in claim 20 wherein the elongated slots are elongated perpendicular to the conveying direction.

23. A tray conveyor as in claim 22 wherein the elongated slots include first slots extending inward from the first side of the conveyor frame past the centerline of the top guide surface and second slots extending inward from the second side of the conveyor frame past the centerline of the top guide surface and wherein the first slots alternate with the second slots in the conveying direction.

24. A tray conveyor as in claim 19 wherein the through holes are cruciform in shape.

25. A tray conveyor as in claim 19 wherein the top guide surface is convexly crowned and the bottom of the tray is concavely contoured to complement the top guide surface.

26. A tray conveyor as in claim 19 wherein the linear-motor stator includes ironless cores.

27. A tray conveyor as in claim 19 wherein the conveyor frame includes an inverted-L-shaped tray rail along each of the first and second sides of the conveyor frame and extending over the tray to retain the tray by limiting vertical excursion of the tray and horizontal excursion of the tray perpendicular to the conveying direction.

28. A tray conveyor as in claim 19 further comprising position sensors housed in the stator enclosure at spaced apart positions in the conveying direction to detect the presence of a tray at the spaced apart positions.

29. A tray conveyor as in claim 19 wherein the linear-motor stator housed in the stator enclosure comprises a first stator extending along the first side of the conveyor frame and a second stator extending along the second side of the conveyor frame and wherein the forcer in the tray includes a first magnet array close to the first stator and a second magnet array close to the second stator.

30. A tray conveyor as in claim 19 wherein:
the conveyor frame includes:
 a first section;
 a second section perpendicular to the first section; and
 a junction section joining the first section in series with the second section wherein the linear-motor stator in the junction section has a first linear-motor stator in line with the linear-motor stator in the first section and a second linear-motor stator in line with the linear-motor stator in the second section and perpendicular to the first stator;
wherein the forcer includes a first magnet array and a second magnet array perpendicular to the first magnet array arranged so that, when the tray is in the junction section, the first magnet array is aligned with the first stator or the second magnet array is aligned with the second stator so that the tray is driven by the first stator and then by the second stator to translate from the first section to the second section in the junction section without rotation.

31. A tray conveyor as in claim 19 wherein:
the conveyor frame includes:
 a first section extending in length in a first direction;
 a second section extending in length in a second direction perpendicular to the first direction; and
 a junction section joining the first section in series with the second section wherein the junction section has a first set of three-phase coils arranged to propagate an electromagnetic wave in the first direction and a second set of three-phase coils arranged to propagate an electromagnetic wave in the second direction;
wherein the forcer includes a magnet array in a checkerboard pattern of magnets of alternating polarity arranged in rows and columns oblique to the first and second directions interacting with the electromagnetic waves of the first and second sets of three-phase coils in the junction section to translate the tray received from the first conveyor section to the second conveyor section.

32. A tray conveyor as in claim 19 wherein the top of the tray is made of a first plastic material and the bottom of the tray is attached to the top and made of a second plastic material.

33. A tray conveyor as in claim 32 wherein the first plastic material is a hygienic material and the second plastic material is a low-friction material.

* * * * *